United States Patent
Golla et al.

(10) Patent No.: US 11,916,746 B1
(45) Date of Patent: Feb. 27, 2024

(54) DECISION TREE BASED DYNAMIC MESH TOPOLOGY

(71) Applicant: Juniper Networks, Inc., Sunnyvale, CA (US)

(72) Inventors: Krishna Mohan Golla, Bangalore (IN); Venkata Rajasekharu Athreyapurapu, Bangalore (IN); Prasad V, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 309 days.

(21) Appl. No.: 17/304,238

(22) Filed: Jun. 16, 2021

(51) Int. Cl.
*H04L 41/12* (2022.01)
*H04L 41/5009* (2022.01)
*H04L 41/16* (2022.01)
*G06N 5/01* (2023.01)

(52) U.S. Cl.
CPC ............. *H04L 41/12* (2013.01); *G06N 5/01* (2023.01); *H04L 41/16* (2013.01); *H04L 41/5009* (2013.01)

(58) Field of Classification Search
CPC ..... H04L 41/12; H04L 41/16; H04L 41/5009; G06N 5/01
See application file for complete search history.

(56) References Cited

U.S. PATENT DOCUMENTS

| | | |
|---|---|---|
| 9,450,817 B1 | 9/2016 | Bahadur et al. |
| 9,794,165 B1 | 10/2017 | Wood |
| 9,898,317 B2 | 2/2018 | Nakil et al. |
| 2015/0244617 A1* | 8/2015 | Nakil ................. H04L 41/0897 709/224 |

FOREIGN PATENT DOCUMENTS

| | | | | |
|---|---|---|---|---|
| EP | 3806396 A1 * | 4/2021 | ............. | G06N 20/00 |
| WO | WO-2021140505 A1 * | 7/2021 | ........... | G06F 16/245 |

* cited by examiner

*Primary Examiner* — Samina F Choudhry
(74) *Attorney, Agent, or Firm* — Shumaker & Sieffert, P.A.

(57) ABSTRACT

A computing device may determine an occurrence of a network event associated with a pair of network devices of a plurality of network devices included in a network. The computing device may, in response to determining the occurrence of the network event, determine a plurality of network parameters associated with the network. The computing device may determine, using a plurality of decision trees and based on the plurality of network parameters, a number of overlay tunnels to add between the pair of network devices. The computing device may create the number of overlay tunnels over an underlay topology of the network between the pair of network devices.

20 Claims, 11 Drawing Sheets

DECISION TREE BASED DYNAMIC MESH TOPOLOGY

TECHNICAL FIELD

The invention relates to computer networks and, more specifically, to a dynamic mesh topology for computing networks.

BACKGROUND

A wide variety of customer devices connect to service provider networks to access resources and services provided by packet-based data networks, such as the Internet, enterprise intranets, content providers, and virtual private networks (VPNs). Each service provider network typically provides an extensive network infrastructure to provide packet-based data services to the customer devices. The service provider networks may comprise a wide area network (WAN) that connects to sites (e.g., local area networks) to allow sites to communicate with each other.

The network infrastructure of a WAN typically includes a vast collection of access nodes, aggregation nodes and high-speed edge routers interconnected by communication links. These network devices typically execute various protocols and exchange signaling messages to anchor and manage subscriber sessions and communication flows associated with customer devices. A software defined network (SDN) controller may be included in the network architecture to provide centralized control of the subscriber sessions and communication flows within the service provider network. The SDN controller may create one or more overlay tunnels that connect pairs of sites across the WAN. The overlay tunnels in the WAN form a mesh topology of overlay tunnels over the underlying infrastructure of the WAN.

SUMMARY

In general, techniques are described for dynamically managing a mesh topology of overlay tunnels that are created over an underlay network of a WAN in ways that optimize the site-to-site traffic based on the network parameters associated with the WAN. As conditions of the WAN change, the techniques may adjust the topology of the overlay tunnels in real-time to optimize the performance of the mesh topology.

A SDN controller may monitor a WAN to determine the occurrence of a network event associated with a pair of sites connected over the WAN. The SDN controller may, in response, determine, based on a plurality of network parameters associated with the WAN, whether to create one or more new overlay tunnels between the pair of sites or to delete one or more overlay tunnels that connect the pair of sites. The SDN controller may, for each of the plurality of network parameters, use a corresponding decision tree to determine, based on the network parameter, a decision that indicates the number or overlay tunnels to add or remove between the pair of sites in accordance with the respective network parameter. The SDN controller may then determine, based on the plurality of decisions associated with the plurality of network parameters, the total number or overlay tunnels to add or remove between the pair of sites.

In an example, this disclosure describes a method. The method includes determining, by a computing device, an occurrence of a network event associated with a pair of network devices of a plurality of network devices included in a network; in response to determining the occurrence of the network event, determining, by the computing devices, a plurality of network parameters associated with the network; determining, by the computing device using a plurality of decision trees and based on the plurality of network parameters, a number of overlay tunnels to add between the pair of network devices; and creating, by the computing device, the number of overlay tunnels over an underlay topology of the network between the pair of network devices.

In another example, this disclosure describes a computing device comprising: a memory; and processing circuitry in communication with the memory and configured to: determine an occurrence of a network event associated with a pair of network devices of a plurality of network devices included in a network; in response to determining the occurrence of the network event, determine a plurality of network parameters associated with the network; determine, using a plurality of decision trees and based on the plurality of network parameters, a number of overlay tunnels to add between the pair of network devices; and create the number of overlay tunnels over an underlay topology of the network between the pair of network devices.

In another example, this disclosure describes a non-transitory computer-readable storage medium encoded with instructions that, when executed, cause one or more programmable processors to: determine an occurrence of a network event associated with a pair of network devices of a plurality of network devices included in a network; in response to determining the occurrence of the network event, determine a plurality of network parameters associated with the network; determine, using a plurality of decision trees and based on the plurality of network parameters, a number of overlay tunnels to add between the pair of network devices; and create the number of overlay tunnels over an underlay topology of the network between the pair of network devices.

The details of the techniques are set forth in the accompanying drawings and the description below. Other features, objects, and advantages of the techniques will be apparent from the description and drawings, and from the claims.

BRIEF DESCRIPTION OF DRAWINGS

Like reference characters denote like elements throughout the figures and text.

DETAILED DESCRIPTION

Figure 1A:
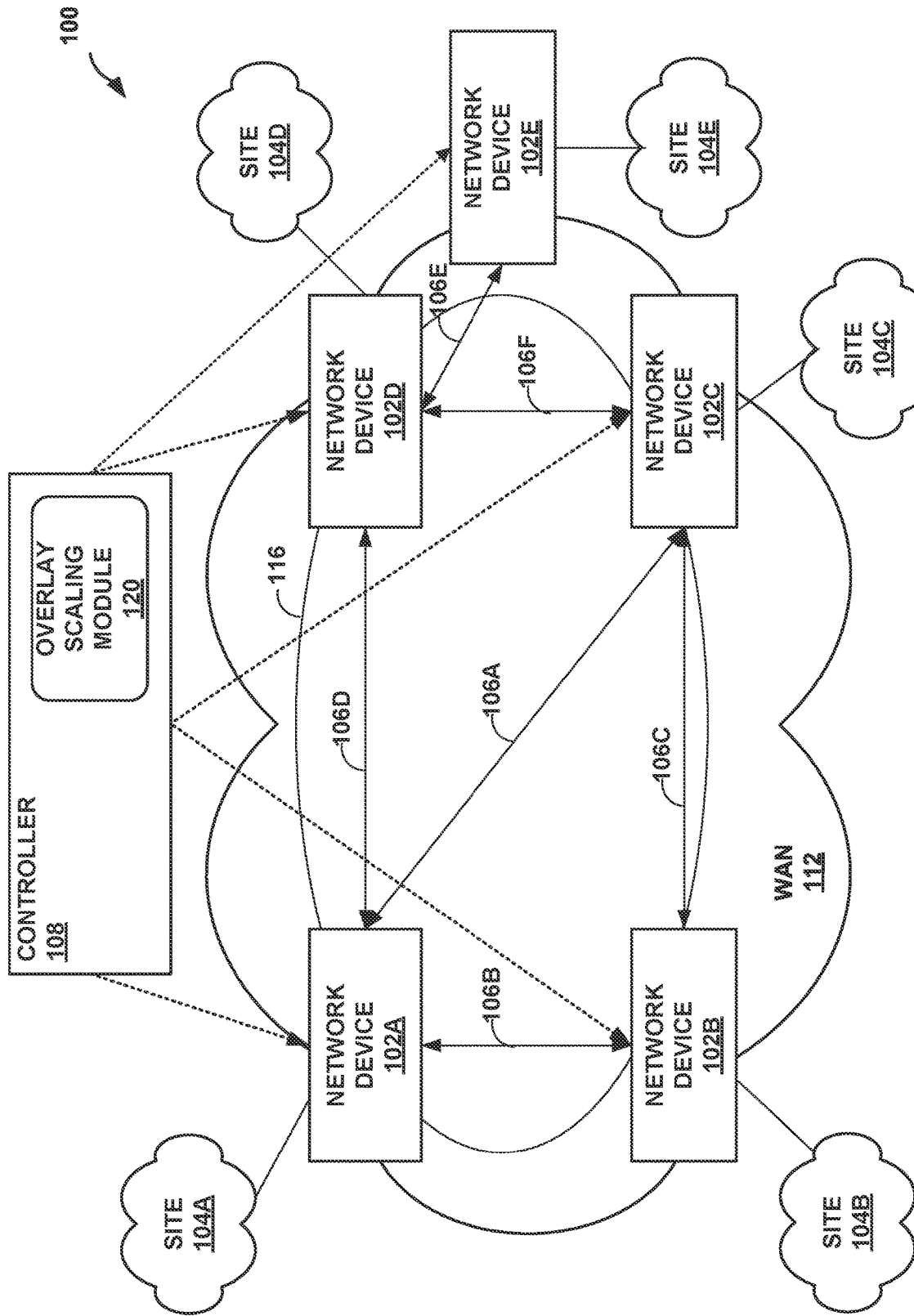
FIGS. 1A and 1B are block diagrams illustrating an example system, having a network and a controller, and configured to operate in accordance with techniques described in this disclosure.

In general, aspects of this disclosure describe techniques for a SDN controller to dynamically manage a mesh topology of overlay tunnels between sites that are created over an underlay network of a wide area network (WAN). The SDN controller may dynamically manage the mesh topology of overlay tunnels in real-time based on the network parameters of the WAN to add and remove overlay tunnels between sites based on changing network conditions of the WAN to optimize the performance of the mesh topology.

One technique for managing a mesh topology of overlay tunnels between sites that are created over an underlay network of a WAN includes creating a full mesh topology of overlay tunnels that connect every site to every other site. However, a site may be configured to support only a limited number of overlay tunnels and may not be able to support an overlay tunnel to every other site. Furthermore, given n tunnels, the number of tunnels in the full mesh topology is $O(n^2)$. Thus, creating such a full mesh topology to connect thousands of sites may require millions of overlay tunnels to be created in the WAN, which may require a significant amount of network and storage resources to monitor and manage the overlay tunnels over time.

Another technique for managing a mesh topology of overlay tunnels between sites that are created over an underlay network of a WAN includes creating a dynamic mesh topology of overlay tunnels where an overlay tunnel is dynamically created between a pair of sites when the traffic between the pair of sites rises above a threshold, and where an overlay tunnel is dynamically removed between a pair of sites when the traffic between the pair of sites falls below a threshold. When the SDN controller determines that the traffic between the pair of sites rises above a threshold, the SDN controller may use a greedy algorithm to create the maximum allowable number of overlay tunnels between the pair of sites.

For example, if the maximum allowable number of overlay tunnels between the pair of sites is three, the SDN controller may, in response to the traffic between the pair of sites rising above a threshold, create three overlay tunnels between the pair of sites. Similarly, the SDN controller may, in response to the traffic between the pair of sites falling below a threshold, remove all of the overlay tunnels between the pair of sites.

However, such a technique for creating a dynamic mesh topology of overlay tunnels may not provide optimal performance with respect to site-to-site traffic. For example, the topology of overlay tunnels created via such a technique may depend on the timing of traffic between sites. Furthermore, such a technique for creating a dynamic mesh topology of overlay tunnels may not take into account other factors such as resource usage of network devices, the maximum allowable number of overlay tunnels that can be managed by the SDN controller, user intent, and the like.

For example, if the SDN controller has created the maximum allowable number of overlay tunnels between a first site and a second site, and if the SDN controller determines that the traffic between the first site and a third site rises above a threshold, the SDN controller may be unable to create an overlay tunnel between the first site and the third site because the number of overlay tunnels between the first site and the second site is already at the maximum number of overlay tunnels supported by the first site. In another example, because such a technique for creating a dynamic mesh topology of overlay tunnels may not take into account parameters such as the processor usage and memory usage of a network devices associated with a site, the SDN controller may add one or more overlay tunnels to connect to a site regardless of the processor usage and memory usage of the network devices associated with a site, thereby increasing the processor and memory burdens of the network device and further degrading the performance of the network device.

As such, in accordance with aspects of the present disclosure, an SDN controller may monitor a WAN to dynamically manage a mesh topology of overlay tunnels between sites that are created over an underlay network of the WAN based on network parameters associated with the WAN. The SDN controller may determine the occurrence of a network event associated with a pair of sites connected over the WAN and may, in response, determine, based on a plurality of network parameters associated with the WAN, whether to create one or more new overlay tunnels between the pair of sites or to delete one or more overlay tunnels that connect the pair of sites. The plurality of network parameters may include user intent, the processor usage of network devices associated with the pair of sites, the memory usage of the network devices associated with the pair of sites, one or more overlay tunnel limits for the pair of sites, the number of overlay tunnels that can be managed by the SDN controller, and the link status of links in the underlay topology of the WAN, and the like. The SDN controller may, for each of the plurality of network parameters, use a corresponding decision tree to determine, based on the network parameter, a decision that indicates the number or overlay tunnels to add or remove between the pair of sites. The SDN controller may determine, based on the plurality of decisions associated with the plurality of network parameters, the number or overlay tunnels to add or remove between the pair of sites.

The techniques of this disclosure may provide one or more technical advantages. By dynamically managing a mesh topology of overlay tunnels based on a plurality of network parameters, the techniques of this disclosure may dynamically adjust the mesh topology of overlay tunnels in real-time based on changes to a variety of different network parameters. Dynamically adjusting the mesh topology of overlay tunnels in real-time based on changes to a variety of different network parameters may potentially improve the performance of the WAN, such as by decreasing the processor usage of network devices of the WAN and by increasing the rate at which data traffic can be communicated between sites via the WAN, thereby improving the performance of network devices as well as the performance of a network.

Figure 1B:
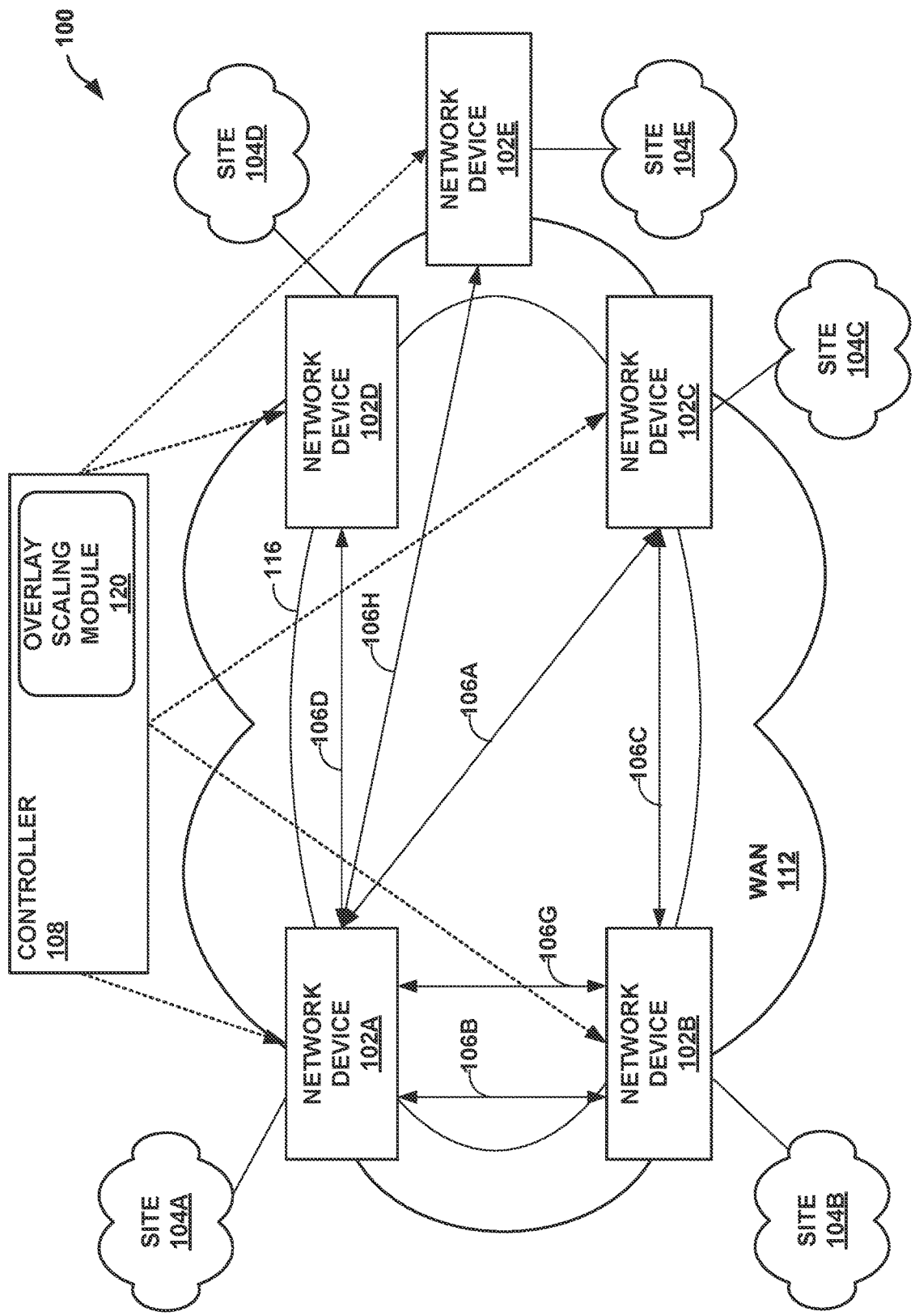

FIGS. 1A and 1B are block diagrams illustrating an example wide area network (WAN) having a dynamic mesh topology of overlay tunnels over an underlay network topology, in accordance with the techniques of this disclosure. As illustrated in FIG. 1A, network system 100 includes wide area network (WAN) 112 having network devices 102A-102E ("network devices 102") that connect remote sites 104A-104E ("sites 104") to WAN 112. WAN 112 may support overlay tunnels, such as overlay tunnels 106A-106F ("overlay tunnels 106"), between network devices 102 on top of the underlay topology 116 of WAN 112 in order to connect one or more of sites 104 across WAN 112. Such overlay tunnels may enable sites 104 to securely communicate and share data over the underlying topology 116 of WAN 112. For example, controller 108 may create overlay tunnels in the form of layer 2 connections over the underlying layer 3 network of WAN 112. In some examples, such overlay tunnels may be Internet Protocol security (IPsec) tunnels, virtual private networks (VPNs), dynamic VPNs (DVPNs), or other virtual networks.

WAN 112 may include one or more autonomous systems, data centers, branch offices, private network, public networks, cloud networks, the Internet, or another public network. In some cases, WAN 112 may comprise a multi-protocol label switching (MPLS) network. In some cases, WAN 112 may comprise a mobile communication network, such as a 5G mobile network. WAN 112 may have underlay network topology 116, which may comprise an Internet Protocol (IP) fabric and/or MPLS network fabric of nodes and links.

Network devices 102 in WAN 112 may represent a router, a switch, or other suitable network device to connect sites 104 to WAN 112. In some examples, network devices 102 may be customer edge (CE) network devices, such as gateway routers for sites 104 that are configured to connect sites 104 to WAN 112.

Each of sites 104 may include a local area network (LAN) or a wide area network (WAN) that comprises a plurality of subscriber devices, such as desktop computers, laptops, workstations, PDAs, wireless devices, network-ready appliances, file servers, print servers or other devices. In some examples, at least one of sites 104 may comprise a data center site having specialized facilities that provide storage, management, and dissemination of data to subscribers and other entities. A data center site may include, for example, a plurality of servers and storage area networks (SANs) that provide computing environments for subscribers/customers. Subscriber devices may connect to the data center site to request and receive services and data provided by the data center site.

Network system 100 includes controller 108. Controller 108 may comprise a software defined network (SDN) controller that provides centralized control of customer sessions and communication flows within WAN 112 by configuring and managing the overlay tunnels 106 between network devices 102 in WAN 112. Controller 108, therefore, may configure and manage the routing and switching infrastructure within WAN 112. Further example details of an SDN controller are described in U.S. Pat. No. 9,898,317, issued Feb. 20, 2018, and U.S. Pat. No. 9,794,165, issued Oct. 17, 2017, the entire contents of each of which are incorporated herein by reference.

In accordance with aspects of this disclosure, controller 108 may monitor WAN 112 to determine the occurrence of a network event associated with a pair of network devices (e.g., network devices 102A and 102B) of network devices 102. A network event associated with a pair of network devices may be an event associated with the data traffic between the pair of network devices. Controller 108 may, in response to determining the occurrence of a network event associated with a pair of network devices, determine network parameters associated with WAN 112 and may, based on such network parameters, dynamically modify the mesh topology of overlay tunnels 106 of network devices 102 in real-time to create one or more new overlay tunnels between the pair of network devices of network devices 102 and/or to remove one or more overlay tunnels between the pair of network devices of network devices 102. Such network parameters may be associated with network events associated with WAN 112, such as service level agreement (SLA) events, network traffic events, link status change events, and the like.

Controller 108 includes overlay scaling module 120 that determines, based on based on a plurality (i.e., two or more) network parameters, whether to create and/or delete one or more overlay tunnels between a pair of network devices (e.g., network devices 102A and 102B) associated with the network event. Specifically, overlay scaling module 120 may, for each network parameter of the plurality of network parameters, use a decision tree to determine, based on the network event, a decision regarding whether to create and/or delete one or more overlay tunnels between the pair of network devices. If overlay scaling module 120 determines, for a plurality of network events, a plurality of decisions regarding whether to create and/or delete one or more overlay tunnels between the pair of network devices in WAN 112, overlay scaling module 120 may determine, based on the plurality of decisions, whether to create and/or remove one or more overlay tunnels between the pair of network devices. Controller 108 may therefore communicate with network devices 102 in WAN 112 to create and/or remove one or more overlay tunnels between network devices 102.

In the example of FIG. 1B, the network parameters associated with WAN 112 may indicate that the processing usage of network device 102D and the memory usage of network device 102B are both too high. Overlay scaling module 120 may determine, based on the network parameters indicating that the processing usage of network device 102D and the memory usage of network device 102B are both too high, to reduce the number of overlay tunnels to which network devices 102D is connected by removing overlay tunnels 106E and 106F connected to network device 102D. Because overlay tunnel 106E is the only overlay tunnel connected to network device 102E from another one of network devices 102, overlay scaling module 120 may also determine to add overlay tunnel 106H between network devices 102A and 102E, so that network device 102E is connected via overlay tunnel 106H to network device 102A. Controller 108 may therefore communicate with network devices 102 to direct network devices 102 to remove overlay tunnels 106E and 106F and to add overlay tunnel 106H between network devices 102A and 102E.

The network parameters may also indicate that overlay tunnel 106B between network devices 102A and network device 102B is performing in a suboptimal manner, such as the performance of overlay tunnel 106B not meeting a service level agreement. Overlay scaling module 120 may determine, based on the network parameters, to add overlay tunnel 106G between network devices 102A and 102B to alleviate the performance issues of overlay tunnel 106B. Controller 108 may therefore communicate with network devices 102A and 102B to add overlay tunnel 106G between network devices 102A and 102B.

In this way, controller 108 may continuously monitor WAN 112 for the occurrence of network events between pairs of network devices of network devices 102. As controller 108 detects the occurrence of network events in WAN 112, controller 108 may utilize the network parameters associated with WAN 112 to modify, in real-time, the mesh topology of overlay tunnels 106 to add and/or delete overlay tunnels to optimize the data traffic between network devices 102 of WAN 112.

Figure 2:
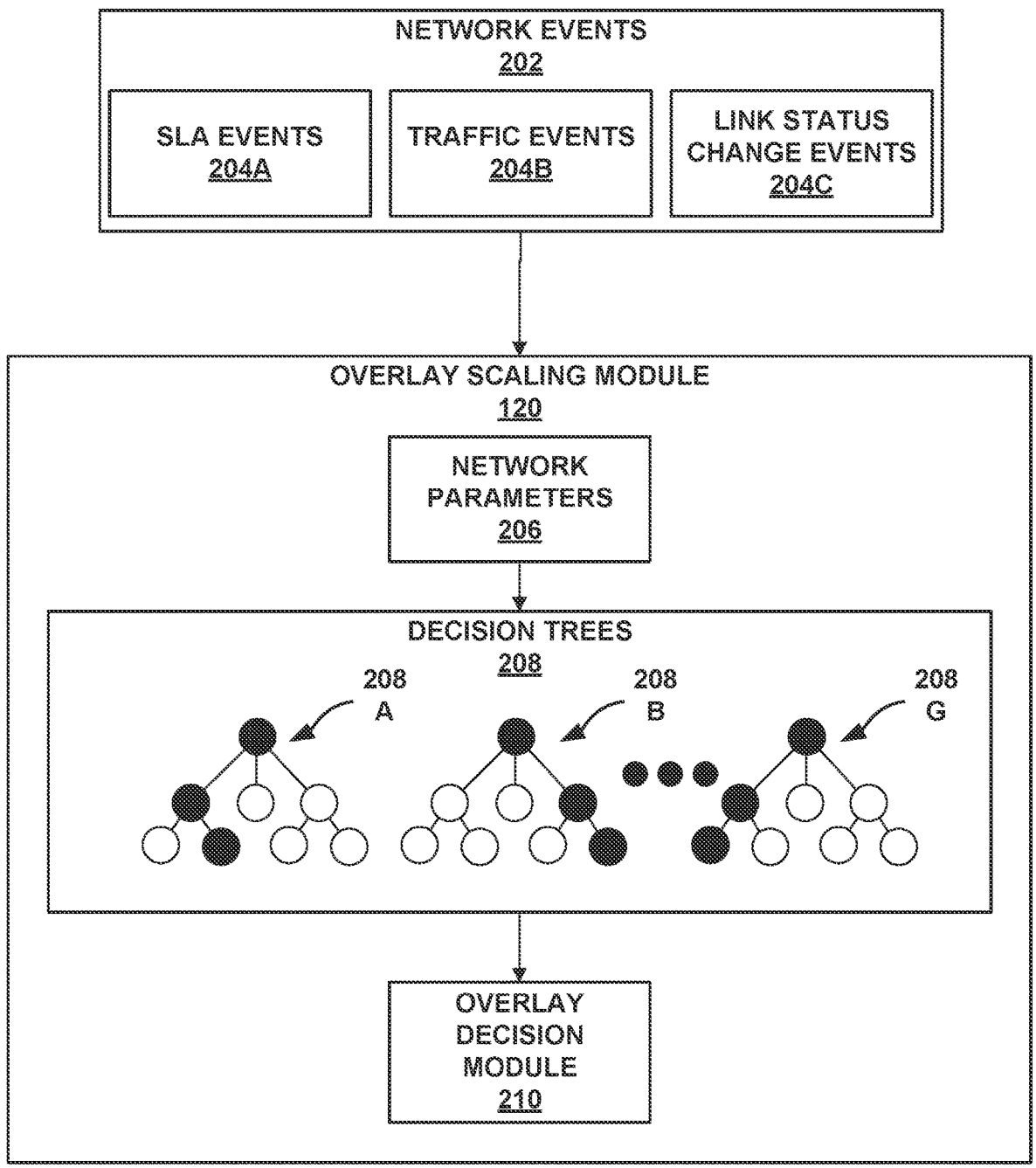
FIG. 2 is a block diagram illustrating the overlay scaling module 120 of FIGS. 1A and 1B in further detail.

FIG. 2 is a block diagram illustrating the overlay scaling module 120 of FIGS. 1A and 1B in further detail. As shown in FIG. 2, overlay scaling module 120 may receive network events 202 associated with a pair of network devices, such as network devices 102A and 102B, of network devices 102. In the example of FIG. 2, network events 202 associated with the pair of network devices 102A and 102B may include one or more SLA events 204A, one or more traffic events 204B, and/or one or more WAN link status change events 204C. While FIG. 2 describes a pair of network devices using the example of network devices 102A and 102B, the techniques described in FIG. 2 are applicable to any pair of network devices in a WAN.

One or more SLA events 204A associated with a pair of network devices 102A and 102B may include network events associated with data traffic between the pair of network devices 102A and 102B missing one or more SLAs, such as an application SLA, a network SLAs, and the like. For example, one or more SLA events 204A may include an SLA miss event that indicates a link between the pair of a network devices 102A and 102B is experiencing poor connection quality and causing the data traffic between the pair of network devices 102A and 102B to miss one or more application SLAs. Such an SLA miss event may indicate that one or more alternative overlay tunnels should be added between the pair of network devices 102A and 102B.

One or more traffic events 204A associated with a pair of network devices 102A and 102B may include events associated with data traffic between the pair of network devices 102A and 102B, such as an event when the amount of data traffic between the pair of network devices 102A and 102B crosses a threshold to create an overlay tunnel between the pair of network devices 102A and 102B, or an event when the data traffic between the pair of network devices 102A and 102B crosses a threshold to delete an overlay tunnel between the pair of network devices 102A and 102B.

One or more WAN link status change events 204C may include events associated with one or more links in the underlay topology 116 of WAN 112 between the pair of network devices 102A and 102B going up or going down. For example, if an overlay tunnel between the pair of network devices 102A and 102B goes over a link in the underlying topology that has gone down, a WAN status change event indicating that such a link has gone down may indicate to overlay scaling module 120 a need to create a new overlay tunnel between the pair of network devices 102A and 102B to route around the downed link.

Overlay scaling module 120 may, in response to the occurrence of one or more of network events 202 associated with a pair of network devices of network devices 102, such as the pair of network devices 102A and 102B, determine whether to modify the mesh topology of overlay tunnels 106 connecting sites 104 to add one or more overlay tunnels and/or to remove one or more overlay tunnels between the pair of network devices 102A and 102B based on network parameters 206 associated with WAN 112. Network parameters 206 may include any information associated with WAN 112 network devices 102, underlay topology 116, and overlay tunnels 106. Examples of network parameters 206 include the processor usage and/or memory usage of each the pair of network devices 102A and 102B associated with the network event, overlay tunnel limits of the pair of network devices 102A and 102B, the link status of links in the underlying topology 116 of WAN 112 between the pair of network devices 102A and 102B, limits on the total number of overlay tunnels in WAN 112 that can be managed by controller 108, and the like.

Overlay scaling module 120 includes decision trees 208 that overlay scaling module 120 may use to determine, based on network parameters 206, whether to modify the mesh topology of overlay tunnels 106 connecting sites 104 to add one or more overlay tunnels and/or to remove one or more overlay tunnels between a pair of network devices of network devices 102, such as the pair of network devices 102A and 102B. Specifically, overlay scaling module 120 may use decision trees 208 to determine, based on network parameters 206, the number of overlay tunnels to add between the pair of network devices 102A and 102B. The number of overlay tunnels to add may be an integer, where a negative value may indicate the number of overlay tunnels between the pair of network devices 102A and 102B to remove, and where a zero value may indicate to overlay scaling module 120 to not add or remove any overlay tunnels between the pair of network devices 102A and 102B.

Decision trees 208 may include, for each of network parameters 206, a corresponding decision tree that overlay scaling module 120 may use to process the corresponding network parameter of network parameters 206 to determine, based on the corresponding network parameter, a decision that indicates the number of overlay tunnels to add between the pair of network devices 102A and 102B. In the example of FIG. 2, decision trees 208 may include decision trees 208A-208G. Each of decision trees 208 is a tree-like data structure associated with a network parameter of WAN 112. Each of decision trees 208 may include internal nodes, branches, and leaf nodes, where each internal node represents a test, each branch represents an outcome of a test (e.g., a decision), and each leaf node represents a decision.

Overlay scaling module 120 may use decision trees 208 to determine, for each parameter of network parameters 206, a that indicates the number of overlay tunnels to add between a pair of network devices, such as the pair of network devices 102A and 102B. That is, overlay scaling module 120 may analyze each network parameter of network parameters 206 using an associated decision tree of decision trees 208 to produce, for each network parameter, an output that is a decision that indicates the number of overlay tunnels to add between the pair of network devices 102A and 102B.

A decision that indicates the number of overlay tunnels to add between the pair of network devices 102A and 102B of network devices 102 may also indicate a weight of the decision. The decision of a decision tree may be presented as a tuple of {weight, number of tunnels}, where weight is the weight of the decision and the number of tunnels is the number of overlays tunnels to add between the pair of network devices 102A and 102B. In some examples, the weight may be defined as one of three values: [normal, user, critical] in increasing order of priority.

Overlay scaling module 120 includes overlay decision module 210 to determine, based on the decisions of decision trees 208 that each indicates the number of overlay tunnels to add between the pair of network devices 102A and 102B, the number of overlay tunnels to add between the pair of network devices 102A and 102B. Decision module 210 may perform any suitable technique, such as majority voting, weighted averaging, and the like to determine, based on the decisions that are the results of analyzing network parameters 206 using decision trees 208, the number of overlay tunnels to add between the pair of network devices 102A and 102B.

Figure 3A:
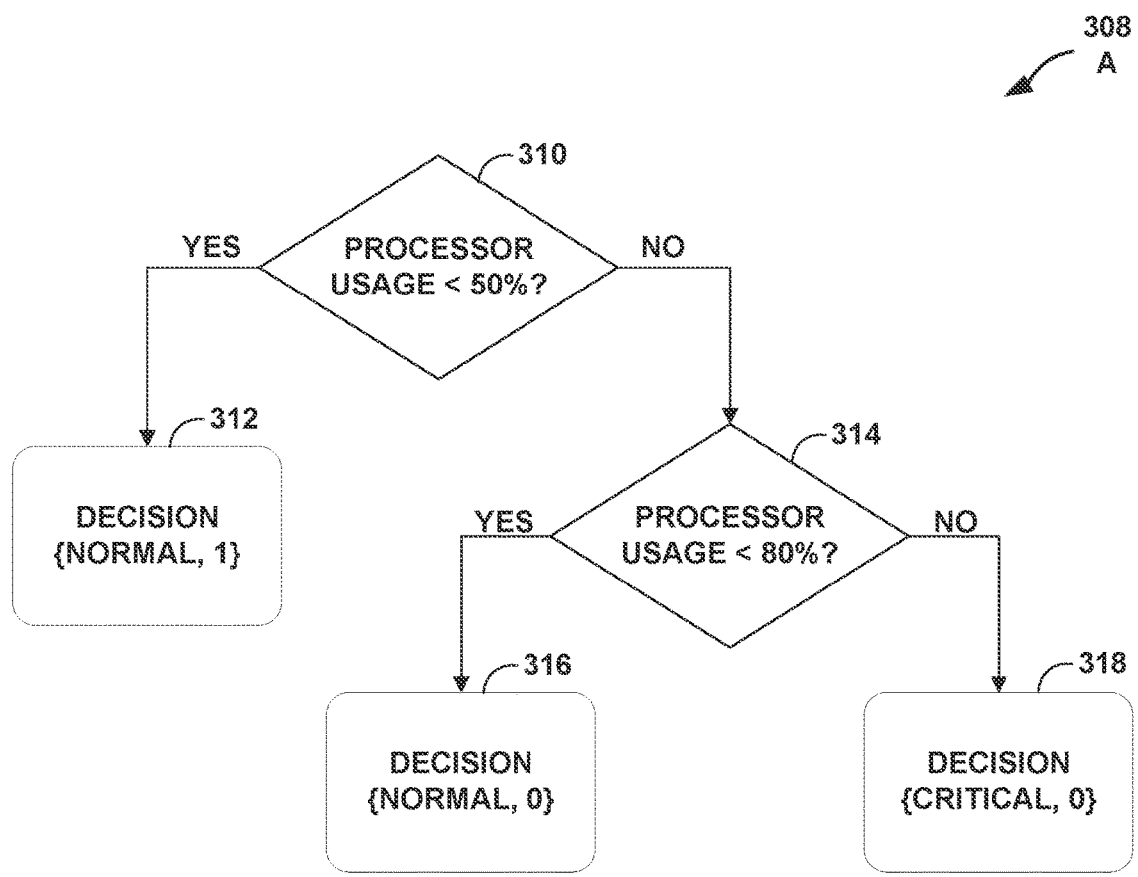
FIGS. 3A-3F are block diagrams illustrating example decision trees that can be used by an example overlay scaling module of FIGS. 1A, 1B, and 2 to determine whether to add or remove one or more overlay tunnels between two or more network devices.

FIGS. 3A-3F are block diagrams illustrating example decision trees that can be used by overlay scaling module 120 of FIGS. 1A, 1B, and 2 to determine whether to add or remove one or more overlay tunnels between two or more network devices of network devices 102, such as the pair of network devices 102A and 102B. As shown in FIG. 3A, decision tree 308A may be associated with a processor usage of a network device in the pair of network devices, and may be used by overlay scaling module 120 of controller 108 to determine, based on the processor usage of a network device, whether to create an overlay tunnel that connects the network device to another network device of network devices 102. For example, in response to the occurrence of a network event associated with a pair of network devices 102A and 102B, overlay scaling module 108A may determine, based on the processor usage of network device 102A, whether to create an overlay tunnel to connect network device 102A to network device 102B.

Overlay scaling module 120 may determine, for network device 102A, whether the processor usage of network device 208A is below 50% (310). If overlay scaling module 120 determines that the processor usage of network device 102A is below 50%, overlay scaling module 120 may determine a decision of decision tree 308A as {normal, 1} (312). Because the decision of a decision tree may be presented as a tuple of {weight, number of tunnels}, the decision of {normal, 1} may indicate a decision having a normal weight (i.e., a low priority) to add one new overlay tunnel that connects network device 102A to another network device of network devices 102, such as network device 102B.

If overlay scaling module 120 determines that the processor usage of network device 102A is not below 50% (i.e., the processor usage is at or above 50%), overlay scaling module 120 may determine whether the processor usage of network device 102A is at or above 50% and below 80% (314). If overlay scaling module 120 determines that the processor usage of network device 102A is at or above 50% and below 80%, overlay scaling module 120 may determine a decision of decision tree 308A as {normal, 0} (316). The decision of {normal, 0} may indicate a decision having a normal weight (i.e., a low priority) to add no new overlay tunnel from network device 102A.

If overlay scaling module 120 determines that the processor usage of network device 102A is at or above 80%, overlay scaling module 120 may determine a decision of decision tree 308A as {critical, 0} (318). The decision of {critical, 0} may indicate a decision having a critical weight (i.e., a high priority) to add zero new overlay tunnel from network device 102A.

Figure 3B:
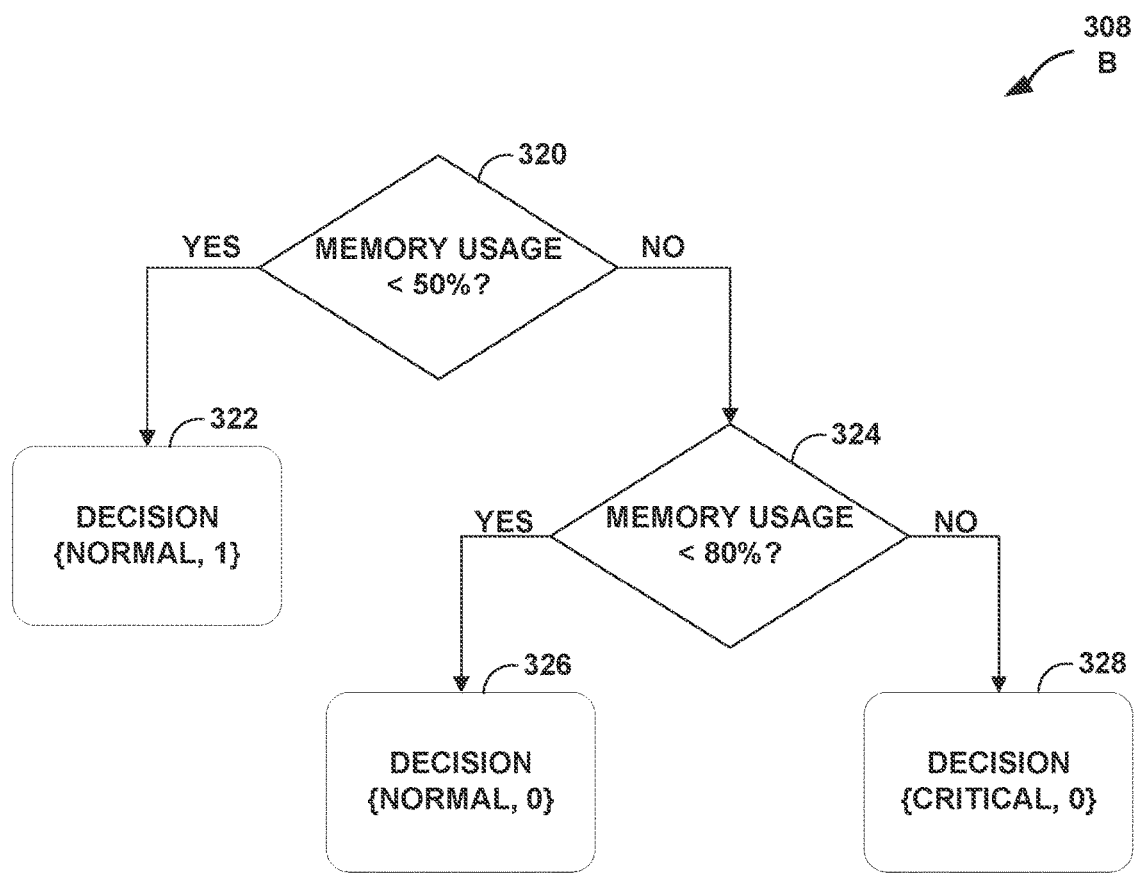

As shown in FIG. 3B, decision tree 308B may be associated with a memory usage of a network device, such as network device 102A and may be used by overlay scaling module 120 of controller 108 to determine, based on the memory usage of 102A, whether to create an overlay tunnel that connects network device 102A to another network device of network devices 102, such as network device 102B. Overlay scaling module 120 may determine, for network device 102A, whether the memory usage of network device 102A is below 50% (320).

If overlay scaling module 120 determines that the memory usage of network device 102A is below 50%, overlay scaling module 120 may determine a decision of decision tree 308B as {normal, 1} (322). Because the decision of a decision tree may be presented as a tuple of {weight, number of tunnels}, the decision of {normal, 1} may indicate a decision having a normal weight (i.e., a low priority) to add one new overlay tunnel that connects network device 102A to another network device of network devices 102, such as network device 102B.

If overlay scaling module 120 determines that the memory usage of network device 102A is not below 50% (i.e., the memory usage is at or above 50%), overlay scaling module 120 may determine whether the memory usage of network device 102A is at or above 50% and below 80% (324). If overlay scaling module 120 determines that the memory usage of network device 102A is at or above 50% and below 80%, overlay scaling module 120 may determine a decision of decision tree 308B as {normal, 0} (326). The decision of {normal, 0} may indicate a decision having a normal weight (i.e., a low priority) to add no new overlay tunnel from network device 102A.

If overlay scaling module 120 determines that the memory usage of network device 102A is at or above 80%, overlay scaling module 120 may determine a decision of decision tree 308B as {critical, 0} (328). The decision of {critical, 0} may indicate a decision having a critical weight (i.e., a high priority) to add no new overlay tunnel from network device 102A.

Figure 3C:
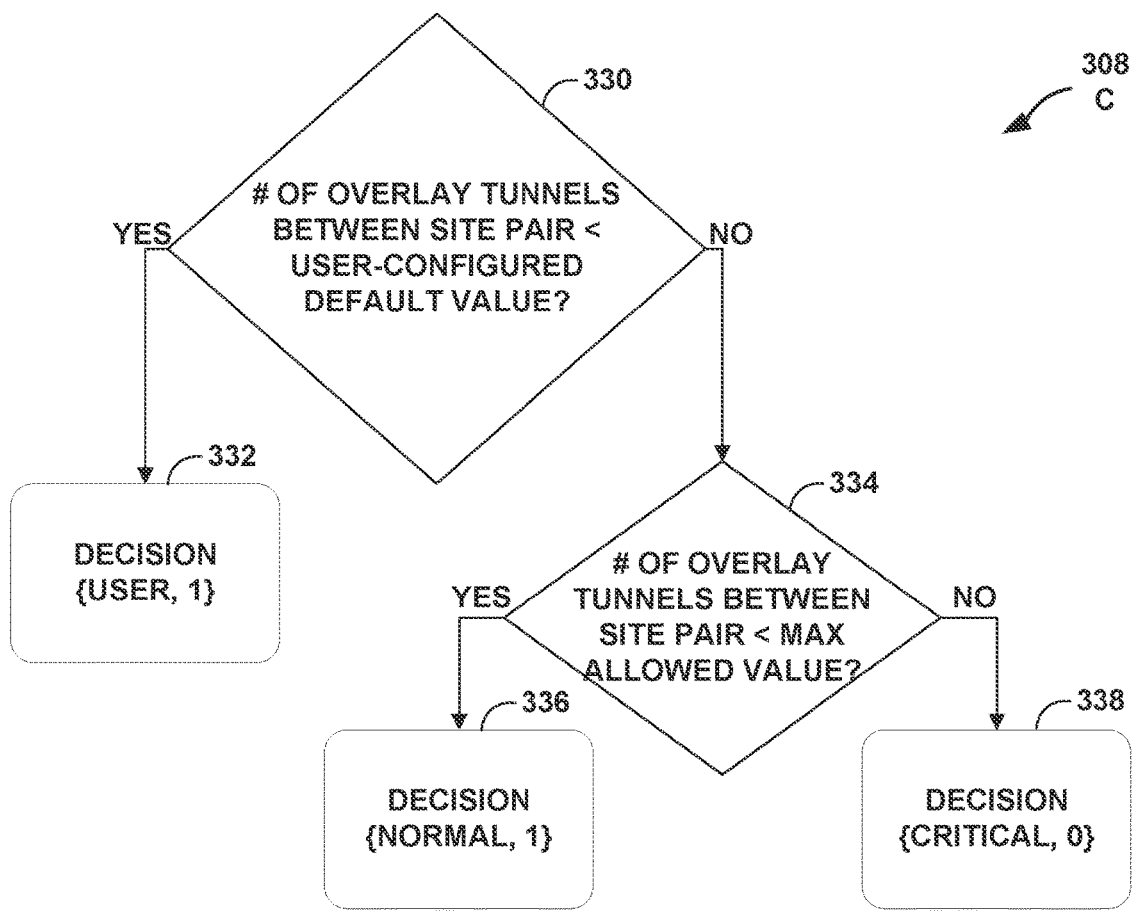

As shown in FIG. 3C, decision tree 308C may be associated with a user intent. Specifically, decision tree 308A may compare with the number of overlay tunnels between a pair of network devices, such as a pair of network devices 102A and 102B, of network devices 102 with a user-configured default value that indicates a user-configured maximum number of tunnels at network device 102A. Overlay module 120 may use decision tree 308C to determine, based on comparing the number of overlay tunnels between the pair of network devices 102A and 102B with a user-configured default value, whether to create one or more new overlay tunnel that connects the pair of network devices 102A and 102B.

Overlay scaling module 120 may determine, for the pair of network devices 102A and 102B, whether the number of overlay tunnels between the pair of network devices 102A and 102B is less than a user-configured default value (330). The user-configured default value may be any integer value, and in general may be less than or equal to a value that is the maximum number of overlay tunnels that can be created between the pair of network devices 102A and 102B, which may, in some examples, be specified by controller 108.

If overlay scaling module 120 determines that the number of overlay tunnels between the pair of network devices 102A and 102B is less than a user-configured default value, overlay scaling module 120 may determine a decision of {user, 1} (332). Because the decision of a decision tree may be presented as a tuple of {weight, number of tunnels}, the decision of {normal, 1} may indicate a decision having a user weight (i.e., a medium priority) to add one new overlay tunnel that connects the pair of network devices 102A and 102B.

If overlay scaling module 120 determines that the number of overlay tunnels between the pair of network devices 102A and 102B is not less than a user-configured default value (i.e., the number of overlay tunnels between the pair of network devices is equal to or greater than the user-configured default value), overlay scaling module 120 may determine whether the number of overlay tunnels between the pair of network devices 102A and 102B is below the maximum number of overlay tunnels that can be created between the pair of network devices 102A and 102B (334). If overlay scaling module 120 determines that the number of overlay tunnels between the pair of network devices 102A and 102B is below the maximum number of overlay tunnels that can be created between the pair of network devices 102A and 102B, overlay scaling module 120 may determine a decision of {normal, 1} (336). The decision of {normal, 1} may indicate a decision having a normal weight (i.e., a low priority) to add a new overlay tunnel between the pair of network devices 102A and 102B.

If overlay scaling module 120 determines that the number of overlay tunnels between the pair of network devices 102A and 102B is not less than the maximum number of overlay tunnels that can be created between the pair of network devices 102A and 102B, overlay scaling module 120 may determine a decision of {critical, 0} (338). The decision of {critical, 0} may indicate a decision having a critical weight (i.e., a high priority) to add no new overlay tunnel between the pair of network devices 102A and 102B.

Figure 3D:
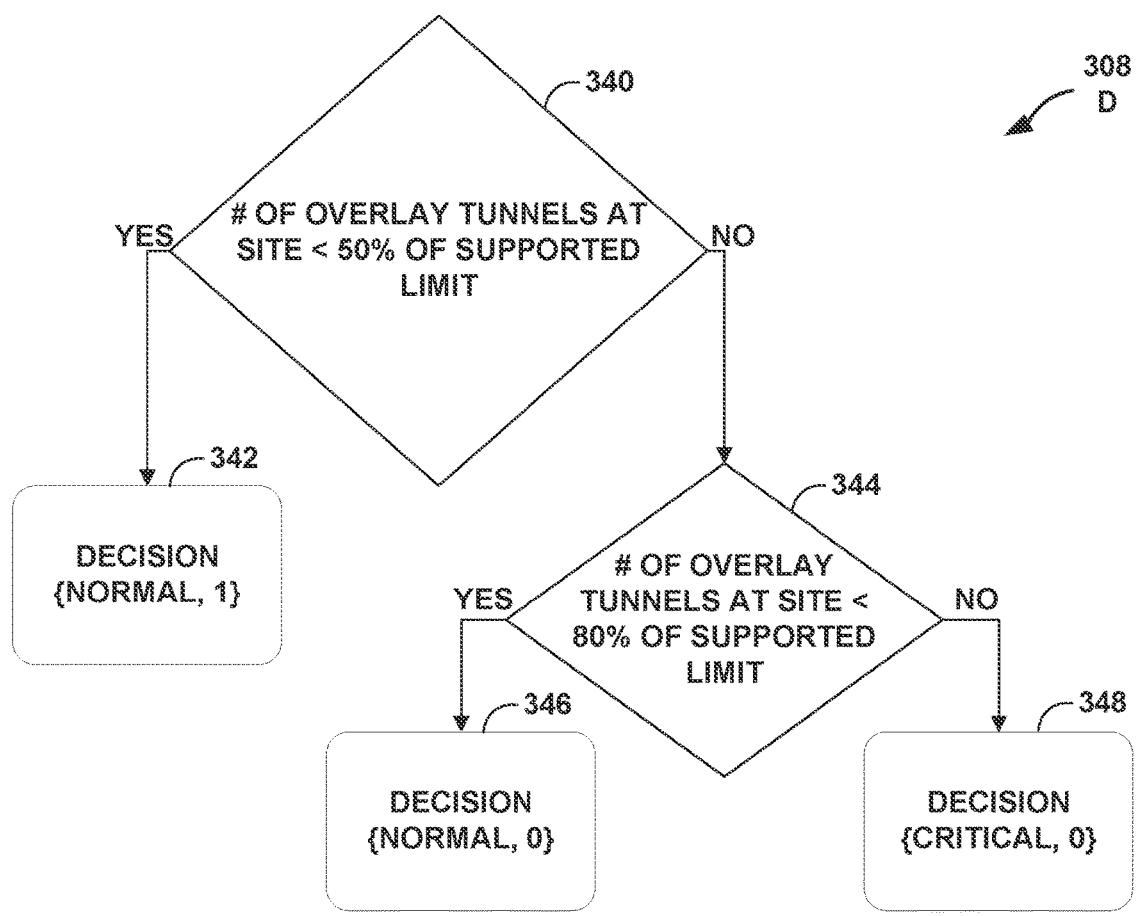

As shown in FIG. 3D, decision tree 308D may be associated with the number of overlay tunnels that are connected to a network device associated with a site and may be used by overlay scaling module 120 of controller 108 to determine, whether to create a new overlay tunnel that connects a network device of network devices 102, such as network device 102A, to another network device of network devices 102, such as network device 102B. Overlay scaling module 120 may determine, for network device 102A, whether the number of overlay tunnels connected to the site is less than 50% of a supported limit of overlay tunnels at network device 102A (340).

If overlay scaling module 120 determines that the overlay tunnels connected to network device 102A is less than 50% of the supported limit of overlay tunnels at network device 102A, overlay scaling module 120 may determine a decision of {normal, 1} (342). Because the decision of a decision tree may be presented as a tuple of {weight, number of tunnels}, the decision of {normal, 1} may indicate a decision having a normal weight (i.e., a low priority) to add one new overlay tunnel at network device 102A to network device 102B.

If overlay scaling module 120 determines that the overlay tunnels at network device 102A is not less than 50% of the supported limit of overlay tunnels at network device 102A, overlay scaling module 120 may determine whether the overlay tunnels at network device 102A is less than 80% of the supported limit of overlay tunnels at network device 102A (344). If overlay scaling module 120 determines that the overlay tunnels at network device 102A is less than 80% of the supported limit of overlay tunnels at network device 102A, overlay scaling module 120 may determine a decision of {normal, 0} (346). The decision of {normal, 0} may indicate a decision having a normal weight (i.e., a low priority) to add no new overlay tunnel at network device 102A.

If overlay scaling module 120 determines that the overlay tunnels at network device 102A is not less than 80% of the supported limit of overlay tunnels at network device 102A, overlay scaling module 120 may determine a decision of {critical, 0} (348). The decision of {critical, 0} may indicate a decision having a critical weight (i.e., a high priority) to add no new overlay tunnel at network device 102A.

Figure 3E:
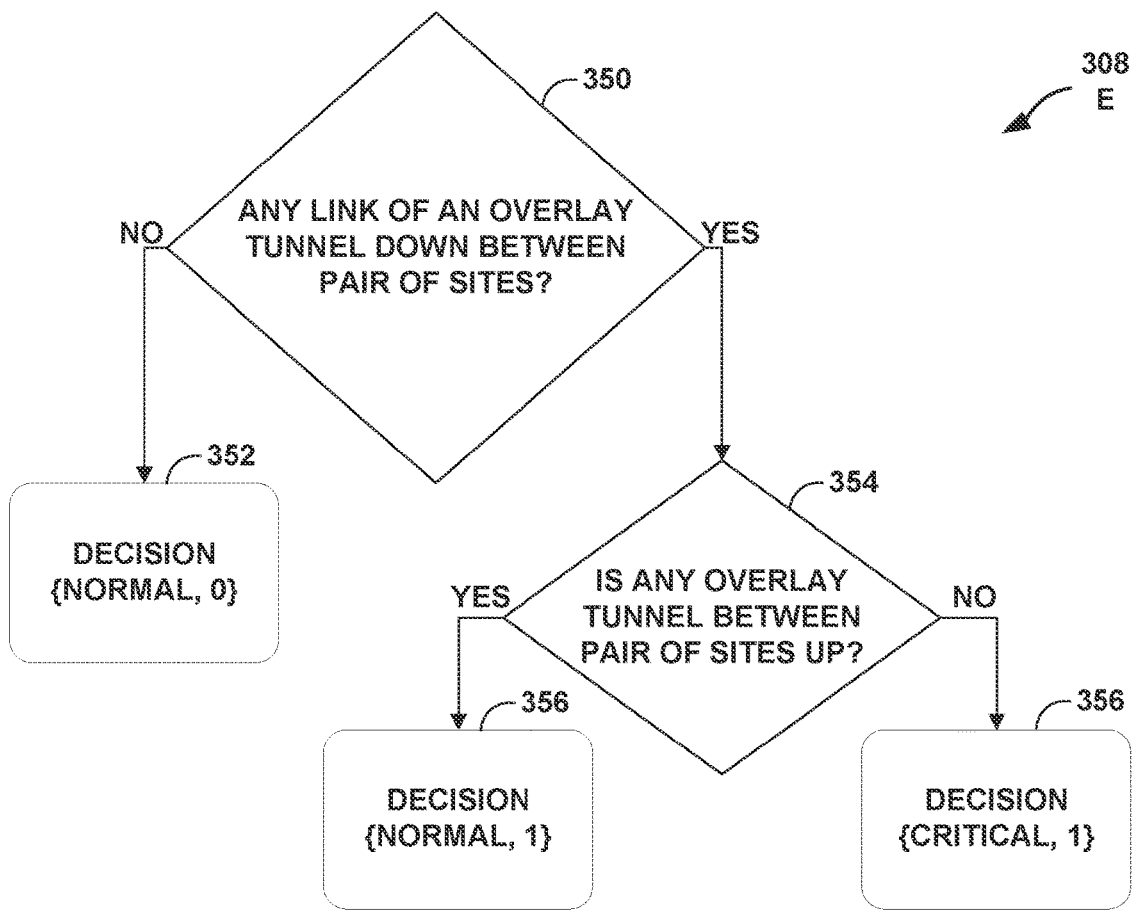

As shown in FIG. 3E, decision tree 308E may be associated with the link status of overlay tunnels between a pair of network devices of network devices 102, such as the pair of network devices 102A and 102B, and may be used by overlay scaling module 120 of controller 108 to determine, whether to create a new overlay tunnel between the pair of network devices 102A and 102B based on the link status of overlay tunnels between the pair of network devices 102A and 102B. Overlay scaling module 120 may determine, for the pair of network devices 102A and 102B, whether a link in the underlay topology 116 of WAN 112 over which an overlay tunnel between the pair of network devices 102A and 102B travels is down (350).

If overlay scaling module 120 determines that no link in the underlay topology 116 of WAN 112 over which any of one or more overlay tunnels between the pair of network devices 102A and 102B travels is down, overlay scaling module 120 may determine a decision of {normal, 0} (352). Because the decision of a decision tree may be presented as a tuple of {weight, number of tunnels}, the decision of {normal, 0} may indicate a decision having a normal weight (i.e., a low priority) to not add a new overlay tunnel between the pair of network devices 102A and 102B.

If overlay scaling module 120 determines that a link in the underlay topology 116 of WAN 112 over which an overlay tunnel between the pair of network devices 102A and 102B travels is down, overlay scaling module 120 may determine whether any overlay tunnel between the pair of network devices 102A and 102B is still up and running (354). If overlay scaling module 120 determines that at least one overlay tunnel between the pair of network devices 102A and 102B is still up and running, overlay scaling module 120 may determine a decision of {normal, 1} (356). The decision of {normal, 1} may indicate a decision having a normal weight (i.e., a low priority) to add one new overlay tunnel between the pair of network devices 102A and 102B.

If overlay scaling module 120 determines no overlay tunnel between the pair of network devices 102A and 102B is still up and running, overlay scaling module 120 may determine a decision as {critical, 1} (358). The decision of {critical, 1} may indicate a decision having a critical weight (i.e., a high priority) to add one new overlay tunnel between the network devices 102A and 102B.

Figure 3F:
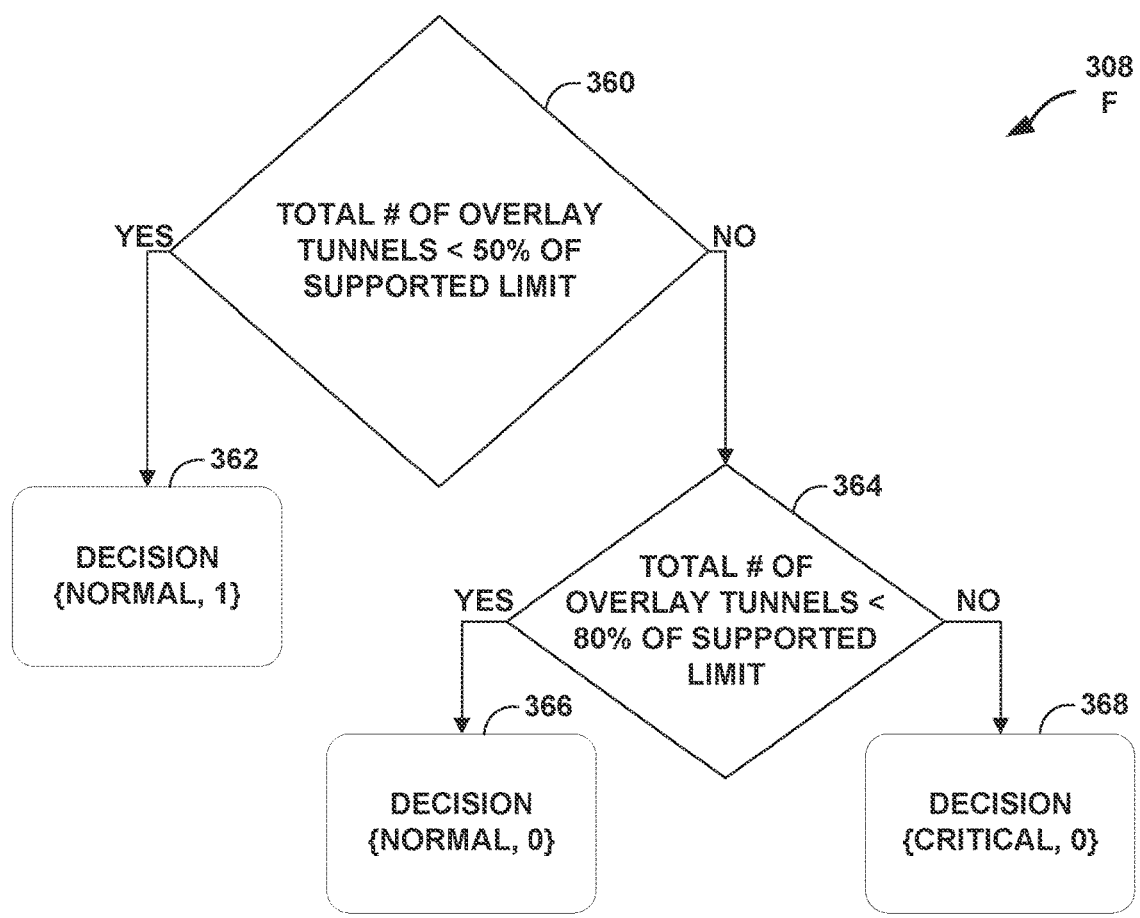

As shown in FIG. 3F, decision tree 308F may be associated with the number of overlay tunnels in WAN 112 managed by controller 108 and may be used by overlay scaling module 120 of controller 108 to determine, whether to create a new overlay tunnel that connects a pair of network devices, such as network devices 102A and 102B, of network devices 102. Overlay scaling module 120 may determine whether the total number of tunnels in WAN 112 managed by controller 108 is less than 50% of a supported limit of overlay tunnels managed by controller 108 (360).

If overlay scaling module 120 determines that the total number of overlay tunnels 106 in WAN 112 less than 50% of the supported limit of overlay tunnels managed by controller 108, overlay scaling module 120 may determine a decision of {normal, 1} (362). Because the decision of a decision tree may be presented as a tuple of {weight, number of tunnels}, the decision of {normal, 1} may indicate a decision having a normal weight (i.e., a low priority) to add one new overlay tunnel between network devices 102A and 102B.

If overlay scaling module 120 determines that the total number of overlay tunnels 106 in WAN 112 is not less than 50% of a supported limit of overlay tunnels managed by controller 108, overlay scaling module 120 may determine whether the total number of overlay tunnels 106 in WAN 112 is less than 80% of the supported limit of overlay tunnels managed by controller 108 (364). If overlay scaling module 120 determines that the total number of overlay tunnels in Wan 112 is less than 80% of the supported limit of overlay tunnels managed by controller 108, overlay scaling module 120 may determine a decision of {normal, 0} (366). The decision of {normal, 0} may indicate a decision having a normal weight (i.e., a low priority) to add no new overlay tunnel between the pair of network devices 102A and 102B.

If overlay scaling module 120 determines that the total number of overlay tunnels 106 in WAN 112 is not less than 80% of the supported limit of overlay tunnels managed by controller 108, overlay scaling module 120 may determine a decision {critical, 0} (368). The decision of {critical, 0} may indicate a decision having a critical weight (i.e., a high priority) to add no new overlay tunnel between network devices 102A and 102B.

Overlay scaling module 120 may determine, based on the decisions of a plurality of decision trees, such as decision trees 308A-308F, whether to modify the mesh topology of overlay tunnels in WAN 112 to add or remove one or more overlay tunnels between a pair of network devices, such as network devices 102A and 102B, of network devices 102. In some examples, overlay scaling module 120 may perform majority voting to determine whether to add or remove one or more overlay tunnels. Thus, if the majority of decisions of the plurality of decision trees are for adding a new overlay tunnel, then overlay module may determine to add an overlay tunnel between a pair of network devices of network devices 102. In another example, if the majority of decisions of the plurality of decision trees are for not adding a new overlay tunnel, then overlay module may determine to not add an overlay tunnel between a pair of network devices of network devices 102. Similarly, if the majority of decisions of the plurality of decision trees are for removing an overlay tunnel between a pair of network devices, then overlay module may determine to remove an overlay tunnel between the pair of network devices of network devices 102.

In some examples, overlay scaling module 120 may perform an averaging of the decisions of the plurality of decision trees to determine whether to add or remove one or more overlay tunnels. Because the decision of each decision tree may indicate a number indicating the number of tunnels to add in accordance with a respective network parameter, overlay scaling module 120 may determine an average (e.g., a mean, a median, a mode, etc.) of the number of tunnels to add indicated by each of the plurality of decision trees. In some examples, overlay scaling module 120 may round the resulting average number of tunnels to add to determine the number of overlay tunnels to add in WAN 112. For example, if the resulting average number of tunnels to add is greater than 0.5 and less than 1, overlay scaling module 120 may round the average number of tunnels to add up to 1 and may determine to add one overlay tunnel. In another example, if the resulting average number of tunnels to add is greater than 0 and less than 0.5, overlay scaling module 120 may round the average number of tunnels to add down to 0 and may determine to add no new overlay tunnels.

In some examples, overlay scaling module 120 may perform a weighted averaging of the decisions of the plurality of decision trees to determine whether to add or remove one or more overlay tunnels. Because the decision of each decision tree may indicate a number indicating the number of tunnels to add as well as an associated weight in accordance with a respective network parameter, overlay scaling module 120 may perform a weighted averaging of the decisions of the plurality of decision trees based on the weight and the number of tunnels to add indicated by each of the decisions of the plurality of decision trees.

For example, given a weight that can indicate up to 3 levels of priority (e.g., low, medium, and high), overlay scaling module 120 may associate a value of 1 to a decision indicating a low level of priority, a value of 2 to a decision indicating a medium level of priority, and a value of 3 to a decision indicating a high level of priority. Overlay module may, for each decision indicating a level of priority and a number of tunnels to add, multiply the value associated with the indicated level of priority with the number of tunnels to add indicated by the decision. Overlay scaling module 120 may add up the result of multiplying the value associated with the indicated level of priority with the number of tunnels to add indicated by the decision for each of the plurality of decision trees and may divide the resulting value with the sum of the value associated with the indicated level of priority for each of the plurality of decision trees to determine a weighted average number of overlay tunnels to add in WAN 112.

Overlay scaling module 120 may round the resulting weighted average number of tunnels to add to determine the number of overlay tunnels to add in WAN 112. For example, if the resulting weighted average number of tunnels to add is greater than 0.5 and less than 1, overlay scaling module 120 may round the weighted average number of tunnels to add up to 1 and may determine to add one overlay tunnel. In another example, if the resulting weighted average number of tunnels to add is greater than 0 and less than 0.5, overlay scaling module 120 may round the weighted average number of tunnels to add down to 0 and may determine to add no new overlay tunnels.

TABLE 1

| CPU | Memory | User Intent | Tunnels at Site | Controller Limits | Link Status | Decision |
| --- | --- | --- | --- | --- | --- | --- |
| 30% {Normal, 1} | 30% {Normal, 1} | Create {User, 1} | 20% {Normal, 1} | 20% Normal, 1} | No uplink {Critical, 1} | Create Overlay Tunnel |

Table 1 shows the example decisions made by overlay scaling module 120 based on analyzing network parameters of WAN 112 using decision trees 308A-308F in response to the occurrence of a network event detected by controller 108, such as the occurrence of a traffic event indicating that the amount of traffic between a pair of network devices of network devices 102 has crossed a threshold associated with creating a new overlay tunnel between the pair of sites. As can be seen, overlay scaling module 120 may use decision trees 308A-308F to process six network parameters: the central processing unit (CPU) usage of each of the pair of network devices, the memory usage of each of the pair of network devices, the user intent to add the overlay tunnel between the pair of network devices, the number of overlay tunnels between the pair of network devices compared with an overlay tunnel limit for the pair of network devices, the total number of overlay tunnels in WAN 112 compared with the limit of overlay tunnels that can be managed by controller 108, and the link status of links in the underlay topology of WAN 12 between the pair of network devices.

As can be seen in Table 1, because processing each of the network parameters using decision trees 308A-308F results in a decision indicating that one new overlay tunnel be added between the pair of network devices, overlay scaling module 120 may determine to create one new overlay tunnel between the pair network devices in WAN 112 based on the decisions associated with each of decision trees 308A-308F.

TABLE 2

| CPU | Memory | User Intent | Tunnels at Site | Controller Limits | Link Status | Decision |
| --- | --- | --- | --- | --- | --- | --- |
| 60% Normal, 0} | 40% {Normal, 1} | Create {Normal, 1} | 60% {Normal, 0} | 20% Normal, 1} | No uplink {Critical, 1} | Create Overlay Tunnel |

Table 2 shows the example decisions made by overlay scaling module 120 based on analyzing network parameters of WAN 112 using decision trees 308A-308F in response to the occurrence of a network event detected by controller 108, such as link in the WAN between a pair of network devices of network devices 102 being down. As can be seen in Table 2, processing each of the network parameters using decision trees 308A-308F results four decisions of adding a single new overlay tunnel between the pair of network sites and two decisions of adding no new overlay tunnel between the pair of network sites.

In some examples, if overlay scaling module 120 uses a technique such as majority vote, averaging, or weighted averaging of the six decisions to determine whether to add an overlay tunnel between the pair of network devices, overlay scaling module 120 may determine to create one new overlay tunnel between the pair network devices in WAN 112 based on the decisions associated with each of decision trees 308A-308F.

In some examples, if overlay scaling module 120 determines that a decision resulting from one of the plurality of decision trees analyzing one of the network parameters indicates the highest level of priority (e.g., a weight of critical) along with the number of tunnels to add between the pair of network devices, then overlay scaling module 120 may add the number of tunnels indicated by the decision having the highest level of priority. As shown in Table 2, because the decision associated with the link status network parameter indicates a weight of critical and one overlay tunnel to add between the pair of network devices, overlay scaling module 120 may determine to create one new overlay tunnel between the pair network devices in WAN 112.

Figure 4:
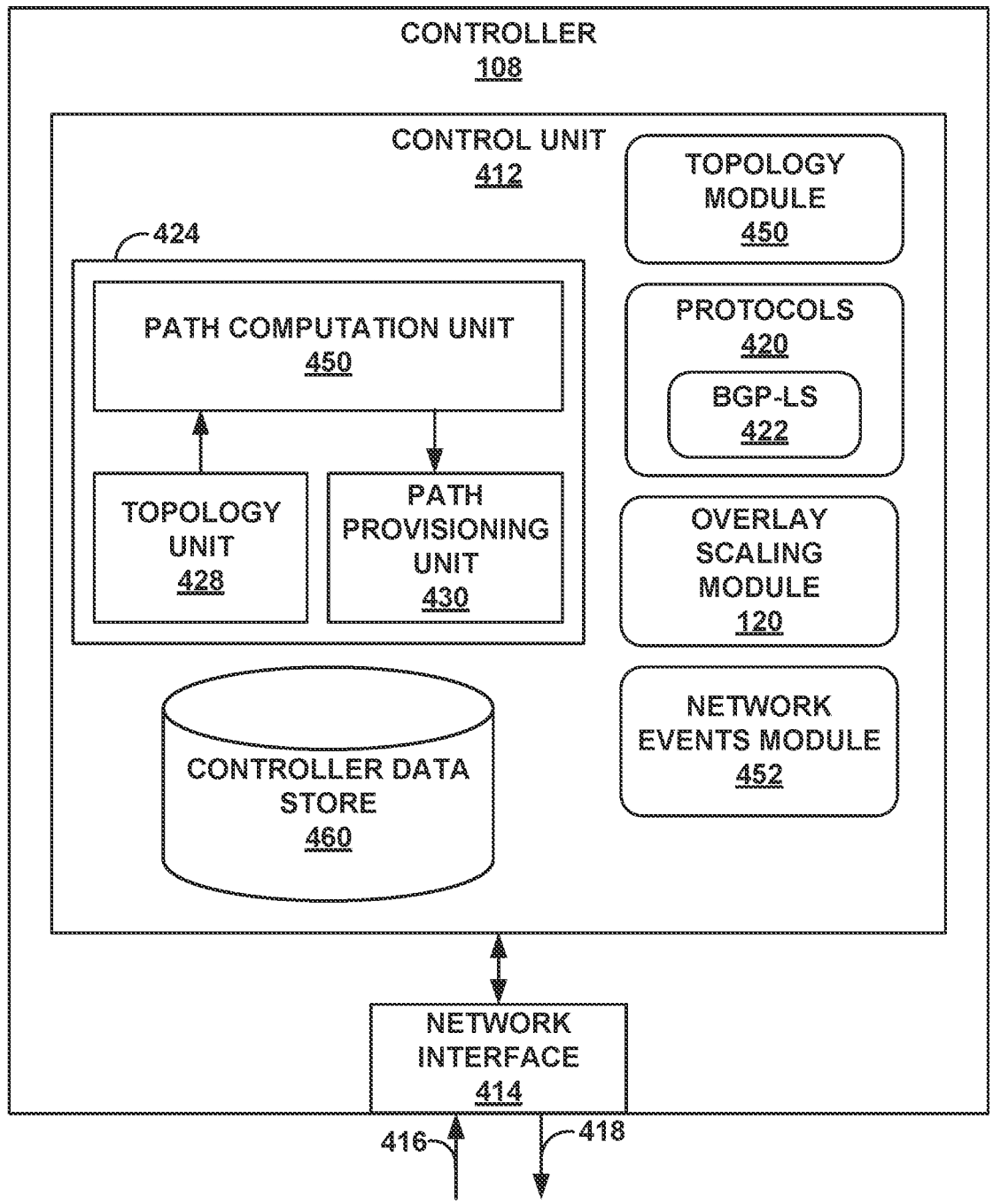
FIG. 4 is a block diagram illustrating an example controller configured to add and remove overlay tunnels in an example network, in accordance with the techniques of this disclosure.

FIG. 4 is a block diagram illustrating an example controller configured to add and remove overlay tunnels in an example network, in accordance with the techniques of this disclosure. The architecture of controller device 108 illustrated in FIG. 4 is shown for example purposes only and should not be limited to this architecture. In other examples, controller device 108 may be configured in a variety of ways. In some examples, controller device 108 may be a distributed WAN controller. Further example details of a distributed WAN controller may be found in U.S. Pat. No. 9,450,817, entitled "Software Defined Network Controller," the entire contents of which is incorporated herein by reference.

Controller device 108 includes a control unit 412 coupled to a network interface 414 to exchange packets with other network devices (e.g., with network devices 102 or other components of WAN 112) via inbound link 416 and outbound link 418. Control unit 412 may include one or more processors (not shown), including processing circuitry, that execute software instructions, such as those used to define a software or computer program, stored to a computer-readable storage medium (not shown). Alternatively, or additionally, control unit 412 may comprise dedicated hardware for performing the techniques described herein.

Control unit 412 provides an operating environment for path computation element (PCE) 424, topology module 450, network events module 452, and overlay scaling module 120. In one example, these units may be implemented as one or more processes executing on one or more virtual machines of one or more servers. That is, while generally illustrated and described as executing on a single controller device 108, aspects of these units may be delegated to other computing devices. Control unit 412 also provides an operating environment for several protocols 420, including BGP-LS 422. In some examples, control unit 412 may use BGP-LS 422 to receive link state information from routers within a computer network, e.g., the underlay topology of WAN 112. Control unit 412 may also forward the received link state information to overlay scaling module 120.

Topology module 450 may determine and maintain topology information (e.g., a traffic engineering database) of the underlying topology 116 of WAN 112, including access, aggregation, and edge nodes, interfaces thereof, and interconnecting communication links. Topology module 450 may be able to determine the status of the underlying topology 116 of WAN 112, such as whether links in the underlying topology are up or down.

As illustrated in FIG. 4, PCE 424 includes a path computation unit 426, a topology unit 428, and a path provisioning unit 430. Topology unit 428 may receive the topology data describing available resources of the computer network, including access, aggregation, and edge nodes, interfaces thereof, and interconnecting communication links. Path computation unit 426 of PCE 424 may use the topology data received by topology unit 128 to compute paths across the computer network. Upon computing the paths, path computation unit 426 may schedule the paths for provisioning by path provisioning unit 430. A computed path includes path information usable by path provisioning unit 430 to establish the path in the network. For example, path provisioning unit 430 may send the path information to network devices to instruct the network devices to establish at least a portion of the path in the network. Provisioning a path may require path validation prior to committing the path to provide for packet transport.

Controller data store 460 may be stored in memory of controller 108 and may store network parameters associated with WAN 112, such as network parameters collected by PCE 424, topology module 450, network events module 452, overlay module 120, and the like. Controller data store 460 may also store network parameters associated with configuration information of controller 108, WAN 112, and network devices 102. For example, controller data store 460 may store an indication of the maximum allowed overlay tunnel value of each of network devices 102, which may be, for each network device, a value indicating the maximum number of overlay tunnels that can be connected to the network device. Controller data store 460 may also store an indication of the overlay tunnel limit of each of network devices 102, which may be, for each network device, a user specified value indicating the maximum number of overlay tunnels that can be connected to the network device, which may be less than or equal to the maximum allowed overlay tunnel value for the network device. Controller data store 460 may also store an indication of the overlay tunnel limit for WAN 112. That is, controller data store 460 may store an indication of the number of overlay tunnels 106 in WAN 112 that can be managed by controller 108. In some examples, controller data store 460 may also store indications of SLAs of network devices 102, SLAs of applications that use WAN 112, and the like.

Network events module 452 may determine the occurrence of network events associated with WAN 112. Network events may include SLA events, traffic events, link status change events, and the like. Network events module 452 may communicate with components of WAN 112, such as network devices 102, routers, hubs, and the like, via network interface 414, to monitor WAN 112 by receiving information associated with WAN 112, such as monitoring the processor usage and memory usage of each of network devices 102, the amount of traffic between network devices 102 of WAN 112, the round trip time of data packets, the amount of jitter of data packets, and the packet loss of data packets. Network events module 452 may also receive information associated with WAN 112 by receiving, from topology module 450 information regarding the status of the underlying topology 116 of WAN 112, such as whether links in the underlying topology are up or down.

Network events module 452 may determine the occurrence of a network event associated with a pair of network devices of network devices 102 based on the information associated with WAN 112. For example, network events module 452 may, in response to receiving, from topology module 450, an indication that a link in the underlay topology 116 of WAN 112 is down, determine whether there is an overlay tunnel over the link between a pair of network devices 102. Network events module 452 may, in response to determining that there is an overlay tunnel over the link between a pair of network devices 102, determine the occurrence of a link status change event associated with the pair of network devices of network devices 102.

In another example, network events module 452 may, based on the amount of traffic between network devices 102 of WAN 112, determine whether the amount of traffic between a pair of network devices has crossed (e.g., is above) a threshold for creating an overlay tunnel between the pair of network devices or has crossed (e.g., is below) a threshold for deleting an overlay tunnel between the pair of network devices. Network events module 452 may, in response to determining that the amount of traffic between a pair of network devices has crossed a threshold for creating or deleting an overlay tunnel between the pair of network devices, determine that a traffic event associated with the pair of network devices of network devices 102 has occurred.

In another example, network events module 452 may determine, based on monitoring the characteristics of data traffic between network devices 102 of WAN 112, such as the amount of traffic between network devices 102 of WAN 112, the round trip time of the data packets, the amount of jitter of the data packets, and/or the packet loss of the data packets determine whether the data traffic between a pair of devices is not meeting an SLA. If network events module 452 determines that the data traffic between a pair of devices is not meeting an SLA, network events module 452 may determine than an SLA event associated with the pair of network devices of network devices 102 has occurred.

In accordance with the disclosed techniques, overlay scaling module 120 add and remove overlay tunnels between pairs of network devices 102 in WAN 112. Overlay scaling module 120 may, in response to network events module 452 determining the occurrence of a network event associated with the pair of network devices of network devices 102 in WAN 112, determine whether to add or remove one or more overlay tunnels between the pair of network devices associated with the network event.

Overlay scaling module 120 may, in response to the occurrence of a network event associated with the pair of network devices of network devices 102, process a plurality of network parameters associated with WAN 112 using a plurality of decision trees, such as decision trees 308A-308F of FIGS. 3A-3F, to determine a plurality of decisions associated with the plurality of network parameters. For example, overlay scaling module 120 may process network parameters such as the processor usage of each of the pair of network devices, the memory usage of each of the pair of network devices, the number of overlay tunnels between the pair of network devices compared with an user-configured overlay tunnel limit for the pair of network devices, the number of overlay tunnels between the pair of network devices compared with an overlay tunnel limit for the pair of network devices, the total number of overlay tunnels in WAN 112 compared with the number of overlay tunnels that can be managed by controller 108, and the link status of links in the underlay topology of WAN 12 between the pair of network devices.

Each of the plurality of decisions resulting from processing the plurality of network parameters using the plurality of decision trees may indicate a number of overlay tunnels to add between the pair of network devices and an associated weight of the decision in accordance with a respective network parameter of the plurality of network parameters. Overlay scaling module 120 may determine, based on the plurality of decisions, a decision of the total number of overlay tunnels to add between the pair of network devices. In some examples, overlay scaling module 120 may use a majority voting technique to determine the number of overlay tunnels to add between the pair of network devices as the number of overlay tunnels to add indicated by the majority of the plurality of decisions. In some examples, overlay scaling module 120 may determine the number of overlay tunnels to add between the pair of network devices based on determining an average of the number of overlay tunnels to add indicated by the plurality of decisions. In some examples, overlay scaling module 120 may determine the number of overlay tunnels to add between the pair of network devices based on determining a weighted average of the number of overlay tunnels to add indicated by the plurality of decisions, where each decision in the plurality of decisions is weighted based on the associated weight of the decision.

Controller 108 may, in response to determining the number of overlay tunnels to add between the pair of network devices, add the determined number of overlay tunnels between the pair of network devices. For example, controller 108 may communicate with each of the pair of network devices to add (e.g., create) the determined number of overlay tunnels between the pair of network devices.

Figure 5:
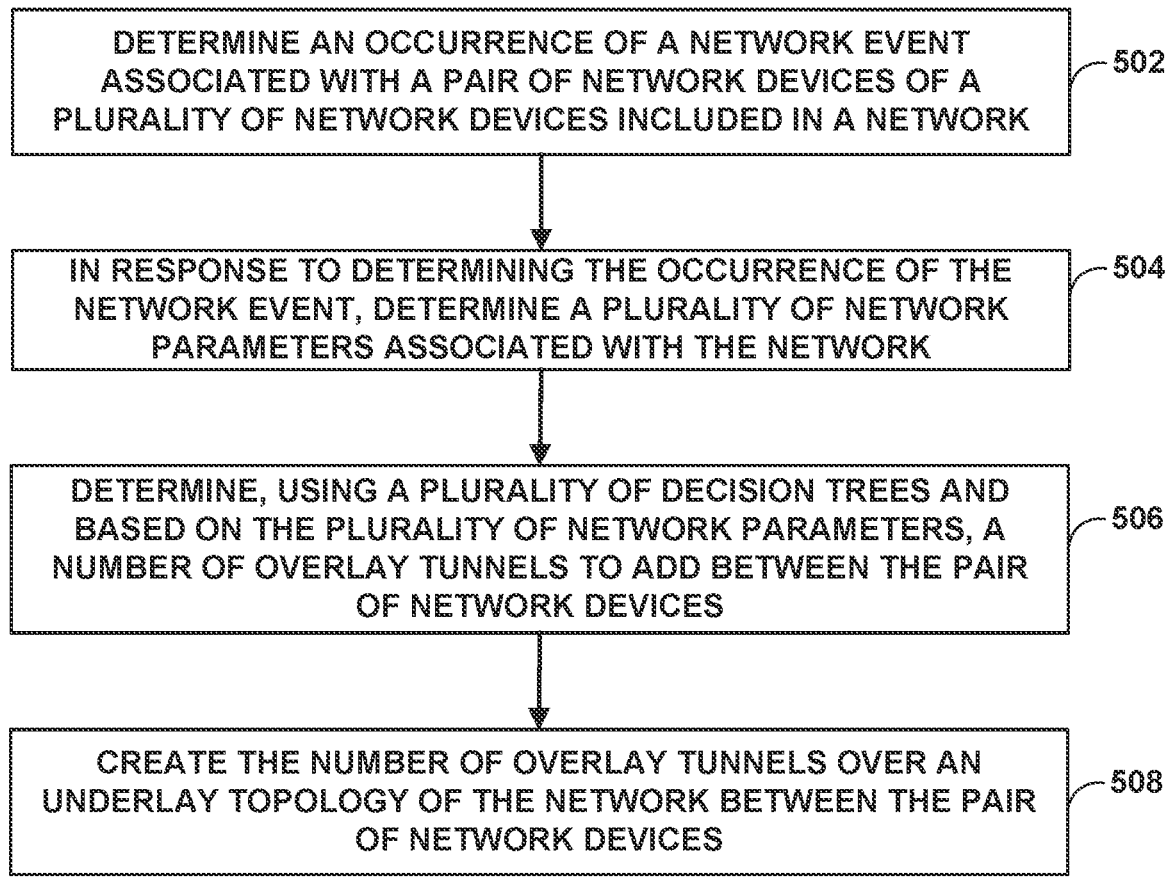
FIG. 5 is a flow diagram illustrating an example operation of a computing device, in accordance with one or more techniques of this disclosure.

FIG. 5 is a flow diagram illustrating an example operation of a computing device, in accordance with one or more techniques of this disclosure. The computing device performing the operation of FIG. 5 may comprise an example of controller 108. As shown in FIG. 5, controller 108 may determine an occurrence of a network event associated with a pair of network devices of a plurality of network devices 102 included in a network 112 (502). Controller 108 may, in response to determining the occurrence of the network event, determine a plurality of network parameters associated with the network 112 (504). Controller 108 may determine, using a plurality of decision trees 208 and based on the plurality of network parameters, a number of overlay tunnels 106 to add between the pair of network devices (506). Controller 108 may create the number of overlay tunnels 106 over an underlay topology 116 of the network 112 between the pair of network devices.(508).

This disclosure includes the following examples:

Example 1: A method includes determining, by a computing device, an occurrence of a network event associated with a pair of network devices of a plurality of network devices included in a network; in response to determining the occurrence of the network event, determining, by the computing device, a plurality of network parameters associated with the network; determining, by the computing device using a plurality of decision trees and based on the plurality of network parameters, a number of overlay tunnels to add between the pair of network devices; and creating, by the computing device, the number of overlay tunnels over an underlay topology of the network between the pair of network devices.

Example 2: The method of example 1, wherein the network event comprises one of: a link status change event, a network traffic event, or a service level agreement (SLA) event.

Example 3: The method of any of examples 1 and 2, wherein the plurality of network parameters comprises two or more of: processor usage associated with the pair of network devices, memory usage associated the pair of network devices, a current number of overlay tunnels between the pair of network devices, a total number of overlay tunnels in the network, and link statuses of links in the underlay topology of the network between the pair of network devices.

Example 4: The method of any of examples 1-3, wherein determining, using the plurality of decision trees and based on the plurality of network parameters, the number of overlay tunnels to add between the pair of network devices of the plurality of network devices further comprises: processing, by the computing device, each of the plurality of network parameters using a corresponding decision tree of the plurality of decision trees to determine a plurality of decisions; and determining, by the computing device and based on the plurality of decisions, the number of overlay tunnels to add between the pair of network devices of the plurality of network devices.

Example 5: The method of example 4, wherein each of the plurality of decisions indicates a corresponding weight and a corresponding number of overlay tunnels to add between the pair of network devices in accordance with a respective network parameter of the plurality of network parameters.

Example 6: The method of example 5, wherein determining, using the plurality of decision trees and based on the plurality of network parameters, the number of overlay tunnels to add between the pair of network devices of the plurality of network devices further comprises: determining, by the computing device, the number of overlay tunnels to add between the pair of network devices of the plurality of network devices as a majority of the corresponding number of overlay tunnels to add between the pair of network devices indicated by each of the plurality of decisions.

Example 7: The method of example 5, wherein determining, using the plurality of decision trees and based on the plurality of network parameters, the number of overlay tunnels to add between the pair of network devices of the plurality of network devices further comprises: determining, by the computing device, the number of overlay tunnels to add between the pair of network devices of the plurality of network devices as an average of the corresponding number of overlay tunnels to add between the pair of network devices indicated by each of the plurality of decisions.

Example 8: The method of example 5, wherein determining, using the plurality of decision trees and based on the plurality of network parameters, the number of overlay tunnels to add between the pair of network devices of the plurality of network devices further comprises: determining, by the computing device, the number of overlay tunnels to add between the pair of network devices of the plurality of network devices as a weighted average of the corresponding number of overlay tunnels to add between the pair of network devices indicated by each of the plurality of decisions that are weighted based on the corresponding weight indicated by each of the plurality of decisions.

Example 9: A computing device includes a memory; and processing circuitry in communication with the memory and configured to: determine an occurrence of a network event associated with a pair of network devices of a plurality of network devices included in a network; in response to determining the occurrence of the network event, determine a plurality of network parameters associated with the network; determine, using a plurality of decision trees and based on the plurality of network parameters, a number of overlay tunnels to add between the pair of network devices; and create the number of overlay tunnels over an underlay topology of the network between the pair of network devices.

Example 10: The computing device of example 9, wherein the network event comprises one of: a link status change event, a network traffic event, or a service level agreement (SLA) event.

Example 11: The computing device of any of examples 9 and 10, wherein the plurality of network parameters comprises two or more of: processor usage associated with the pair of network devices, memory usage associated the pair of network devices, a current number of overlay tunnels between the pair of network devices, a total number of overlay tunnels in the network, and link statuses of links in the underlay topology of the network between the pair of network devices.

Example 12: The computing device of any of examples 9-11, wherein to determine, using the plurality of decision trees and based on the plurality of network parameters, the number of overlay tunnels to add between the pair of network devices of the plurality of network devices, the processing circuitry is further configured to: process each of the plurality of network parameters using a corresponding decision tree of the plurality of decision trees to determine a plurality of decisions; and determine, based on the plurality of decisions, the number of overlay tunnels to add between the pair of network devices of the plurality of network devices.

Example 13: The computing device of example 12, wherein each of the plurality of decisions indicates a corresponding weight and a corresponding number of overlay tunnels to add between the pair of network devices in accordance with a respective network parameter of the plurality of network parameters.

Example 14: The computing device of example 13, wherein to determine, using the plurality of decision trees and based on the plurality of network parameters, the number of overlay tunnels to add between the pair of network devices of the plurality of network devices, the processing circuitry is further configured to: determine the number of overlay tunnels to add between the pair of network devices of the plurality of network devices as a majority of the corresponding number of overlay tunnels to add between the pair of network devices indicated by each of the plurality of decisions.

Example 15: The computing device of example 13, wherein to determine, using the plurality of decision trees and based on the plurality of network parameters, the number of overlay tunnels to add between the pair of network devices of the plurality of network devices, the processing circuitry is further configured to: determine the number of overlay tunnels to add between the pair of network devices of the plurality of network devices as an average of the corresponding number of overlay tunnels to add between the pair of network devices indicated by each of the plurality of decisions.

Example 16: The computing device of example 13, wherein to determine, using the plurality of decision trees and based on the plurality of network parameters, the number of overlay tunnels to add between the pair of network devices of the plurality of network devices, the processing circuitry is further configured to: determine the number of overlay tunnels to add between the pair of network devices of the plurality of network devices as a weighted average of the corresponding number of overlay tunnels to add between the pair of network devices indicated by each of the plurality of decisions that are weighted based on the corresponding weight indicated by each of the plurality of decisions.

Example 17: A non-transitory computer-readable storage medium encoded with instructions that, when executed, cause one or more programmable processors to: determine an occurrence of a network event associated with a pair of network devices of a plurality of network devices included in a network; in response to determining the occurrence of the network event, determine a plurality of network parameters associated with the network; determine, using a plurality of decision trees and based on the plurality of network parameters, a number of overlay tunnels to add between the pair of network devices; and create the number of overlay tunnels over an underlay topology of the network between the pair of network devices.

Example 18: The non-transitory computer-readable storage medium of example 17, wherein the instructions that cause the one or more programmable processors to determine, using the plurality of decision trees and based on the plurality of network parameters, the number of overlay tunnels to add between the pair of network devices of the plurality of network devices further cause the one or more programmable processors to: process each of the plurality of network parameters using a corresponding decision tree of the plurality of decision trees to determine a plurality of decisions; and determine, based on the plurality of decisions, the number of overlay tunnels to add between the pair of network devices of the plurality of network devices.

Example 19: The non-transitory computer-readable storage medium of example 18, wherein each of the plurality of decisions indicates a corresponding weight and a corresponding number of overlay tunnels to add between the pair of network devices in accordance with a respective network parameter of the plurality of network parameters.

Example 20: The non-transitory computer-readable storage medium of example 19, wherein the instructions that cause one or more programmable processors to determine, using the plurality of decision trees and based on the plurality of network parameters, the number of overlay tunnels to add between the pair of network devices of the plurality of network devices further cause the one or more programmable processors to: determine the number of overlay tunnels to add between the pair of network devices of the plurality of network devices as a majority of the corresponding number of overlay tunnels to add between the pair of network devices indicated by each of the plurality of decisions.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium or computer-readable storage device may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

What is claimed is:

1. A method comprising:
   determining, by a computing device, an occurrence of a network event associated with a pair of network devices of a plurality of network devices included in a network;
   in response to determining the occurrence of the network event, determining, by the computing device, a plurality of network parameters associated with the network;
   determining, by the computing device using a plurality of decision trees and based on the plurality of network parameters, a number of overlay tunnels to add between the pair of network devices; and
   creating, by the computing device, the number of overlay tunnels over an underlay topology of the network between the pair of network devices.

2. The method of claim 1, wherein the network event comprises one of: a link status change event, a network traffic event, or a service level agreement (SLA) event.

3. The method of claim 1, wherein the plurality of network parameters comprises two or more of: processor usage associated with the pair of network devices, memory usage associated the pair of network devices, a current number of overlay tunnels between the pair of network devices, a total number of overlay tunnels in the network, and link statuses of links in the underlay topology of the network between the pair of network devices.

4. The method of claim 1, wherein determining, using the plurality of decision trees and based on the plurality of network parameters, the number of overlay tunnels to add between the pair of network devices of the plurality of network devices further comprises:
  processing, by the computing device, each of the plurality of network parameters using a corresponding decision tree of the plurality of decision trees to determine a plurality of decisions; and
  determining, by the computing device and based on the plurality of decisions, the number of overlay tunnels to add between the pair of network devices of the plurality of network devices.

5. The method of claim 4, wherein each of the plurality of decisions indicates a corresponding weight and a corresponding number of overlay tunnels to add between the pair of network devices in accordance with a respective network parameter of the plurality of network parameters.

6. The method of claim 5, wherein determining, using the plurality of decision trees and based on the plurality of network parameters, the number of overlay tunnels to add between the pair of network devices of the plurality of network devices further comprises:
  determining, by the computing device, the number of overlay tunnels to add between the pair of network devices of the plurality of network devices as a majority of the corresponding number of overlay tunnels to add between the pair of network devices indicated by each of the plurality of decisions.

7. The method of claim 5, wherein determining, using the plurality of decision trees and based on the plurality of network parameters, the number of overlay tunnels to add between the pair of network devices of the plurality of network devices further comprises:
  determining, by the computing device, the number of overlay tunnels to add between the pair of network devices of the plurality of network devices as an average of the corresponding number of overlay tunnels to add between the pair of network devices indicated by each of the plurality of decisions.

8. The method of claim 5, wherein determining, using the plurality of decision trees and based on the plurality of network parameters, the number of overlay tunnels to add between the pair of network devices of the plurality of network devices further comprises:
  determining, by the computing device, the number of overlay tunnels to add between the pair of network devices of the plurality of network devices as a weighted average of the corresponding number of overlay tunnels to add between the pair of network devices indicated by each of the plurality of decisions that are weighted based on the corresponding weight indicated by each of the plurality of decisions.

9. A computing device comprising:
a memory; and
processing circuitry in communication with the memory and configured to:
  determine an occurrence of a network event associated with a pair of network devices of a plurality of network devices included in a network;
  in response to determining the occurrence of the network event, determine a plurality of network parameters associated with the network;
  determine, using a plurality of decision trees and based on the plurality of network parameters, a number of overlay tunnels to add between the pair of network devices; and
  create the number of overlay tunnels over an underlay topology of the network between the pair of network devices.

10. The computing device of claim 9, wherein the network event comprises one of: a link status change event, a network traffic event, or a service level agreement (SLA) event.

11. The computing device of claim 9, wherein the plurality of network parameters comprises two or more of: processor usage associated with the pair of network devices, memory usage associated the pair of network devices, a current number of overlay tunnels between the pair of network devices, a total number of overlay tunnels in the network, and link statuses of links in the underlay topology of the network between the pair of network devices.

12. The computing device of claim 9, wherein to determine, using the plurality of decision trees and based on the plurality of network parameters, the number of overlay tunnels to add between the pair of network devices of the plurality of network devices, the processing circuitry is further configured to:
  process each of the plurality of network parameters using a corresponding decision tree of the plurality of decision trees to determine a plurality of decisions; and
  determine, based on the plurality of decisions, the number of overlay tunnels to add between the pair of network devices of the plurality of network devices.

13. The computing device of claim 12, wherein each of the plurality of decisions indicates a corresponding weight and a corresponding number of overlay tunnels to add between the pair of network devices in accordance with a respective network parameter of the plurality of network parameters.

14. The computing device of claim 13, wherein to determine, using the plurality of decision trees and based on the plurality of network parameters, the number of overlay tunnels to add between the pair of network devices of the plurality of network devices, the processing circuitry is further configured to:
  determine the number of overlay tunnels to add between the pair of network devices of the plurality of network devices as a majority of the corresponding number of overlay tunnels to add between the pair of network devices indicated by each of the plurality of decisions.

15. The computing device of claim 13, wherein to determine, using the plurality of decision trees and based on the plurality of network parameters, the number of overlay tunnels to add between the pair of network devices of the plurality of network devices, the processing circuitry is further configured to:
  determine the number of overlay tunnels to add between the pair of network devices of the plurality of network devices as an average of the corresponding number of overlay tunnels to add between the pair of network devices indicated by each of the plurality of decisions.

16. The computing device of claim 13, wherein to determine, using the plurality of decision trees and based on the plurality of network parameters, the number of overlay tunnels to add between the pair of network devices of the plurality of network devices, the processing circuitry is further configured to:
  determine the number of overlay tunnels to add between the pair of network devices of the plurality of network devices as a weighted average of the corresponding number of overlay tunnels to add between the pair of network devices indicated by each of the plurality of decisions that are weighted based on the corresponding weight indicated by each of the plurality of decisions.

17. A non-transitory computer-readable storage medium encoded with instructions that, when executed, cause one or more programmable processors to:

determine an occurrence of a network event associated with a pair of network devices of a plurality of network devices included in a network;

in response to determining the occurrence of the network event, determine a plurality of network parameters associated with the network;

determine, using a plurality of decision trees and based on the plurality of network parameters, a number of overlay tunnels to add between the pair of network devices; and create the number of overlay tunnels over an underlay topology of the network between the pair of network devices.

18. The non-transitory computer-readable storage medium of claim 17, wherein the instructions that cause the one or more programmable processors to determine, using the plurality of decision trees and based on the plurality of network parameters, the number of overlay tunnels to add between the pair of network devices of the plurality of network devices further cause the one or more programmable processors to:

process each of the plurality of network parameters using a corresponding decision tree of the plurality of decision trees to determine a plurality of decisions; and determine, based on the plurality of decisions, the number of overlay tunnels to add between the pair of network devices of the plurality of network devices.

19. The non-transitory computer-readable storage medium of claim 18, wherein each of the plurality of decisions indicates a corresponding weight and a corresponding number of overlay tunnels to add between the pair of network devices in accordance with a respective network parameter of the plurality of network parameters.

20. The non-transitory computer-readable storage medium of claim 19, wherein the instructions that cause one or more programmable processors to determine, using the plurality of decision trees and based on the plurality of network parameters, the number of overlay tunnels to add between the pair of network devices of the plurality of network devices further cause the one or more programmable processors to:

determine the number of overlay tunnels to add between the pair of network devices of the plurality of network devices as a majority of the corresponding number of overlay tunnels to add between the pair of network devices indicated by each of the plurality of decisions.

\* \* \* \* \*